July 14, 1925.

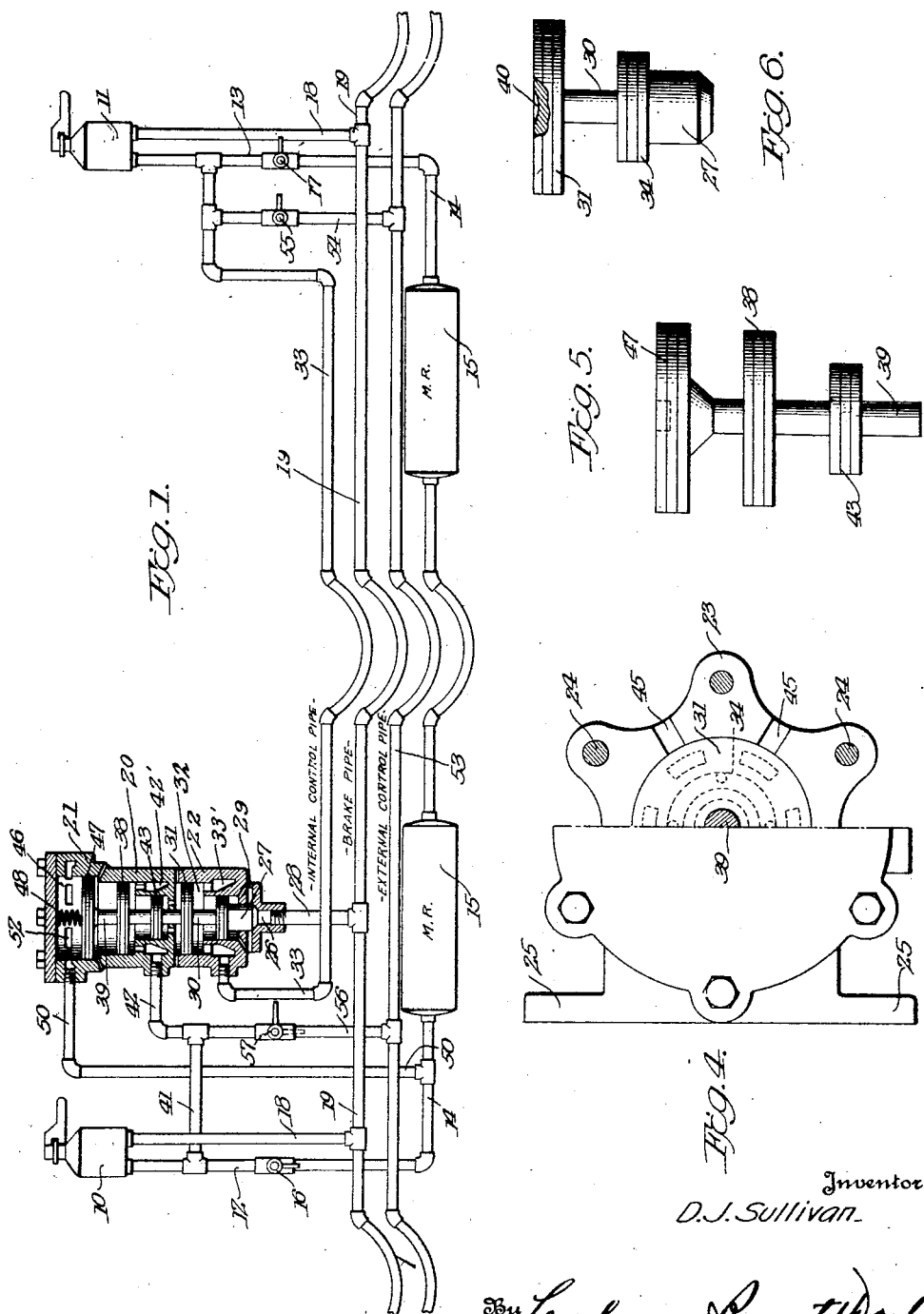

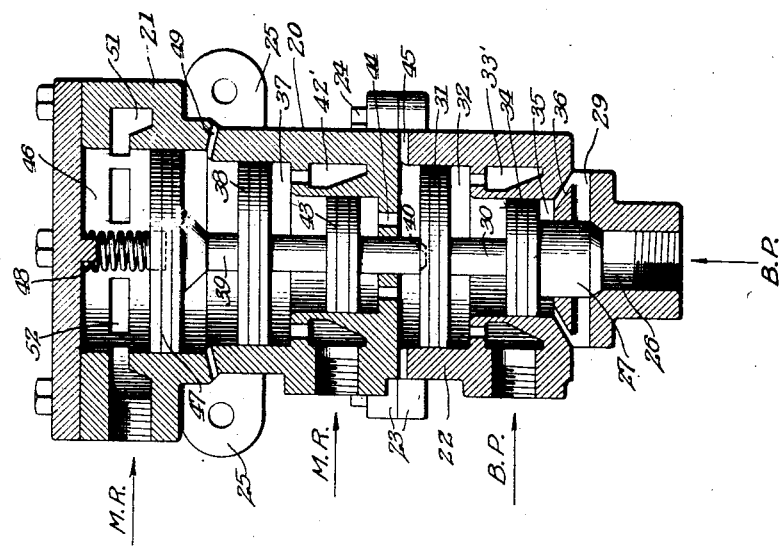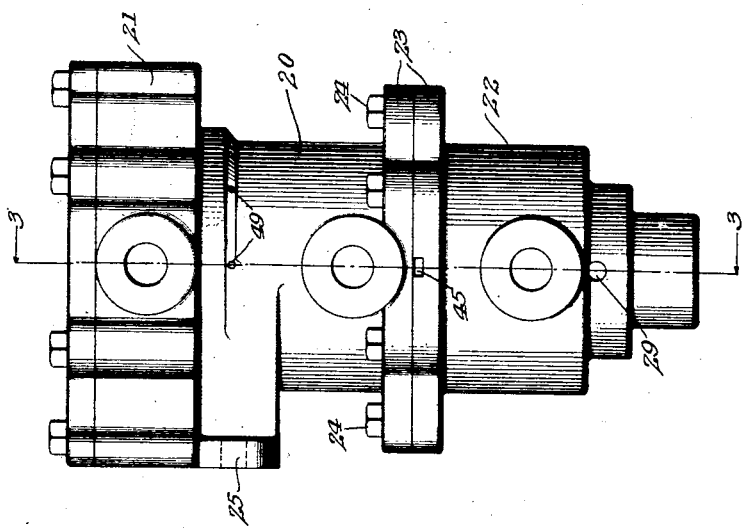

D. J. SULLIVAN 1,545,617

AUTOMATIC CONTROL VALVE FOR AIR BRAKE SYSTEMS

Filed March 17, 1923

Inventor
D. J. Sullivan

Patented July 14, 1925.

1,545,617

UNITED STATES PATENT OFFICE.

DANIEL J. SULLIVAN, OF TRENTON, NEW JERSEY.

AUTOMATIC CONTROL VALVE FOR AIR-BRAKE SYSTEMS.

Application filed March 17, 1923. Serial No. 625,802.

*To all whom it may concern:*

Be it known that I, DANIEL J. SULLIVAN, a citizen of the United States, residing at Trenton, in the county of Mercer and State of New Jersey, have invented new and useful Improvements in Automatic Control Valves for Air-Brake Systems, of which the following is a specification.

The present invention relates to air brake systems, and has particularly to do with double heading, where the control of the system is placed with one of a plurality of brake valves or control stations, which selected brake valve or control station constitutes the active station for application and release of brakes, the other or inactive control stations being cut out, so far as manipulation of the air is concerned.

In double heading with steam locomotives, brake control is customarily given the lead engine, which becomes the active station, the other engine or engines being coupled in so that they will apply and release brakes and maintain pressure, but they are inactive, under normal conditions, so far as manual manipulation of brakes is concerned.

In electric locomotives it is customary to have two control stations, one at each end, and give the control for manual manipulation of air to the station at the front end of the locomotive, the rear station being inactive and cut out, so far as any manual control of braking is concerned.

In electric trains made up of multiple units, each unit of which has two control stations, it is customary to deal with these as in the case of steam locomotives, so that, while all units are coupled together for application and release of brakes and for maintenance of pressure, the manual control is centered in the active control station, all other inactive stations being cut out so far as manual control of brakes is concerned.

In such systems, this elimination of the inactive control stations is usually effected by means of suitable cut-out devices, usually a cut-out cock in the main reservoir connection, the engineer's valve of inactive stations being left in release position, so as to permit main reservoir pressure to pass by way of the inactive engineer's brake valve to the system.

Under these conditions, it is very essential that any derangement at the inactive or dead units or stations, such as the cutting in of main reservoir pressure in an inactive station by the turning, either accidentally or maliciously, of the cut-out cock, should be guarded against, and abnormal conditions automatically cared for. It is with the object of eliminating the danger incident to any such unusual condition that I have developed the automatic control valve which will be hereinafter described, and which is illustrated in the drawings accompanying and forming a part of this disclosure.

I secure this result by providing an automatic control valve so disposed and connected with the usual system as that upon derangement of my inactive station in double heading with steam locomotives; with an electric locomotive having two control stations; or with a multiple unit electric train having a plurality of control stations, my automatic valve will at once function, apply the brakes, and maintain them applied until all the units have been brought to their proper condition, and the system restored to normal.

In the present disclosure I have shown the invention as applied (1) to an electric locomotive having two control stations; (2) to an electric train made up of multiple units, and (3) to a plurality of steam locomotives. It will be understood, of course, that these applications are merely illustrative and in no sense restrictive of my invention.

Referring to the drawings:—

Fig. 1 is a view of a train control system, in which a plurality (2) of control stations are shown, with my automatic control valve for effecting application of brakes under abnormal conditions incorporated in the system, and, furthermore, the system shown in Fig. 1 is designed for use in a multiple unit system of electric trains.

Fig. 2 is a side view of my control valve.

Fig. 3 is a sectional view on substantially the line 3—3 of Fig. 2, looking in the direction of the arrows.

Fig. 4 is a top plan view of the automatic control valve, a portion of the head being removed and the ports shown in dotted lines.

Fig. 5 is a side view of pressure and leakage pistons of the control valve.

Fig. 6 is a side view of the valve proper with its pressure and leakage pistons.

Fig. 7 is a view similar to Fig. 1 of the system applied to a plurality (2) of steam locomotives.

Referring to the drawings by numbers, like numbers indicating like parts in the several views, and considering first Figs. 1 to 6, inclusive, 10 and 11 indicate the engineer's brake valves for manipulation of air on an electric locomotive, the brake valves being of any approved construction, 10, in the present instance, being the active control station, and 11 the inactive control station. These stations are coupled by connections 12 and 13 with the main reservoir pipe 14, there being provided any suitable source of pressure for main reservoir pipe 14, as, for example, main reservoirs 15, pressure in which will be maintained at the desired main reservoir pressure, for example, one hundred and thirty (130) pounds, from any usual pressure generator or pump (not shown).

The pipes 12 and 13, which deliver main reservoir pressure to the brake valves 10 and 11, are provided with cut-out cocks 16 and 17, the cut-out cock 16 of the active control station 10 being open, while the cut-out cock 17 in the pipe 13 of the inactive control station 11 will be closed so as to cut off main reservoir pressure from the brake valve 11.

The brake valves 10 and 11 have connections 18 leading to the brake pipe 19, so that by proper manipulation of the brake valve 10, the brake pipe 19 can be exhausted for application of brakes, and, after application, can be recharged for release of brakes, all in the usual manner.

The arrangement of brake valves, main reservoir pipe, and brake pipe, thus far described, is the usual one in systems of this kind, and, in principle, the same relation of the parts, thus far described, would be found in multiple unit electric trains and in steam locomotives when coupled for double heading.

As has been premised, it is very important that the dead engine or control station be maintained always in cut-out position so far as main reservoir feed to it is concerned, and it is to guard against the disastrous results of the accidental or malicious cutting in of any dead engine or inactive control station, such as would occur in the present illustration if the cut-out valve 17 were opened, and also any other derangement which would interfere with control of braking from the active station, that my automatic control valve is intended.

The automatic control valve 20 is shown assembled with the system in Fig. 1, and in detail in Figs. 2, 3, 4, 5 and 6. As here shown, it is made up of upper and lower sections 21 and 22 for convenience in manufacture and assembly, these sections, as shown in Fig. 2, being secured together in any suitable or usual manner, as by the flanges 23 and bolts 24, and there may be provided any suitable securing lugs 25 by which the valve may be secured to a suitable support.

The automatic valve is provided, at its lower end, with a port 26, closed by a valve 27, the port 26 and valve 27 controlling the connection 28 leading from the automatic valve to brake pipe 19, there being, above the port 26, exhaust passages 29 leading to atmosphere, so that when the valve 27 is opened, the brake pipe will exhaust and an emergency application of brakes made in the manner usual in systems of this kind.

The stem 30 of the automatic valve 27 is provided with a piston 31 in a chamber 32 in the valve casing, the said piston 31 being subjected to brake pipe pressure on its underside by way of pipe 18, inactive brake valve 11, connection 13, and the internal control pipe 33, forming the control connection in a system such as is illustrated in Fig. 1, where the brake valves or control stations are mounted on a single unit, as in the case of a double-ended electric locomotive. The pipe 33 delivers to an annular chamber 33' in the valve casing, from which annular chamber 33', pressure passes to piston 31 by suitable ports in the top of the chamber 33'. Brake pipe pressure beneath the piston 31 tends to open the valve 27, as the area of this piston 31 and of the valve 27 is greater than the area of the small leakage piston 34, with which the stem 30 is provided and which tends to keep pressure constant beneath piston 31, this piston 34 working in a reduced chamber 35 which is open to atmosphere by passages 36, to take care of any leakage which might get past the piston and prevent the building up of pressure beneath the piston 34.

Above the piston valve just described is a second piston chamber 37 in which is mounted a piston 38, the stem 39 of which bears, at its lower end, against the top of the piston 31 of the valve 27 hereinbefore described, and while the stem 39 and the stem 30 might be made integral, they are preferably made independent, one of the other, for ease in manufacture and assembly, and the piston 31 may be grooved or otherwise suitably formed, as shown in dotted lines at 40 in Fig. 3, and in section in Fig. 6, so that when the casing 20 is taken down, a suitable tool may be engaged with the groove or other formation 40 and the valve 27 readily ground to its seat.

The piston 38 is subjected to main reservoir pressure coming from the pipe 12 and the cross connection 41 and pipe 42, which delivers to an annular chamber 42' in the valve casing, from which chamber 42' pressure passes to piston 38 through suitable ports in the top of chamber 42'. This pressure against the piston 38 is partially counterbalanced by the pressure against the leakage piston 43 on the stem 39 below the piston 38, there being provided exhaust passages 44 and 45 to atmosphere to take care of leakage past the piston 43 and prevent building up of pressure beneath it.

The leakage pistons 34 and 43 heretofore described are designed to take the place of stuffing boxes or glands and ensure maintenance of pressure beneath pistons 31 and 38; while at the same time permitting free piston travel and eliminating the friction incident to glands or stuffing boxes about the piston stems.

Above the piston 38, just described, is a piston chamber 46 in which is mounted a piston 47, carried by the stem 39, the pistons 38 and 47 and stem 39 being normally held in close relation to the piston 31 by the spring 48 between the piston 47 and head of the casing 20. Said spring 48 is a light spring which will maintain the parts always in snug relation so that no hammering movements under pressure can occur, and it has the further function of keeping the valve 27 seated when air pressure is cut out, thus preventing the collection of dirt on the valve seat and fouling of the valve so that its operation will be interfered with.

The chamber 46, above the piston 47, as shown in Fig. 1, is connected by pipe 50 with the main reservoir pipe 14, so that main reservoir pressure normally stands above the piston 47, and, through the stem 39 and stem 30, maintains the valve 27 closed against brake pipe pressure, the greater area of the piston 47, subject to main reservoir pressure, being sufficient to overcome the areas of piston 31 and piston 38 which, with their leakage pistons, are subject, respectively, to brake pipe and main reservoir pressure. Under normal running conditions, the piston 47 will keep the valve 27 always in closed position.

The casing 20 is preferably chambered at its upper end at 51 and provided with ports 52 delivering to the chamber 46, so as to insure full main reservoir pressure at all times in the chamber 46 above the piston 47. Below the piston 47 are exhaust ports 49 to take care of leakage past the piston 47 and prevent building up of pressure beneath it.

With this construction and with the parts assembled as described, the system, in normal operation, will stand with the valve 27 and its operating pistons in the position shown in Figs. 1 and 3, with the valve 27 closed against brake pipe pressure; with brake pressure standing below the piston 38, and main reservoir pressure standing above the piston 47. If normal conditions are maintained, the automatic valve will remain in this position, due to the overbalancing pressure on piston 47. If, however, though accident or design, the cut-out valve 17 or any suitable cut-out cock at the inactive station or brake valve 11 should be opened, main reservoir pressure would immediately pass, by pipe 13 and internal control pipe 33, to chamber 32, throwing main reservoir pressure into chamber 32 below the piston 31, which is normally under brake pipe pressure, and this increase in pressure on the under side of piston 31, plus the brake pipe pressure against the valve 27, and the main reservoir pressure beneath piston 38, would overcome main reservoir pressure upon piston 47; the valve 27 would open; brake pipe 19 would be exhausted, and the brakes applied by the usual instrumentalities (not shown), namely, by the brake cylinder, triple-valve, and auxiliary reservoir.

It will be seen that with this automatic valve introduced into the air brake system as specified, all danger of derangement of the system and a consequent loss of control at the active control station or brake valve is avoided, for immediately pressure derangements in the system or abnormal conditions at inactive control stations or brake valves arise, as, for example, the opening of the cut-out cock which admits main reservoir pressure to an inactive control station or brake valve, there will be an automatic application of brakes, and the train will be stopped until conditions are returned to normal, the brake pipe recharged, and the automatic valve brought to running position, which will occur as soon as main reservoir pressure is reduced to brake pipe pressure in chamber 32.

The system as heretofore described is designed particularly for air brakes as installed on electric locomotives, in which, as heretofore stated, there are control stations or brake valves at each end of the locomotive.

In order that the system may be operative in connection with a plurality of units, as, for example, two or more electric locomotives made up into a multiple unit train, I have provided another control for the automatic valve so as to adapt it to multiple unit conditions.

Where the device is used with multiple power units, there is provided the external control pipe 53 which extends from one unit to another. This external control pipe 53, which carries main reservoir pressure, has the connection 54, as shown in Fig. 1, with the internal control pipe 33, the connection 54 being provided with the cut-out cock 55, and, in the example shown, being coupled to the internal control pipe 33 adjacent the inactive control station or brake valve 11.

The external control pipe 53 has also a connection 56 provided with a cut-out cock 57 which leads to the chamber 37 in the automatic valve 20 by way of the pipe 42 hereinbefore described, so as to deliver beneath the piston 38.

With this external control pipe 53 and its connections designed for use with multiple units, the cut-out cock 55 will be closed so as to prevent pressure from the external control pipe 53 passing to the inactive station, and this will be true of all the units which are coupled together, except that unit, usually the forward unit, which has control of the braking. The control unit 10 will have the cock 57 open so that pressure will stand beneath the piston 38 and against the back leakage piston 43.

Under these conditions, brake pipe pressure acting upon the piston 31, and main reservoir pressure acting upon the piston 38, and upon the respective back leakage pistons 34 and 43 will not be sufficient to overcome the main reservoir pressure against the piston 47 tending to close valve 27. If, however, by accident or design, the cut-out cock 55 in the connection 54 from the external control pipe 53 is opened, the main reservoir pressure from 53 will pass, by pipe 33, to chamber 32, and with this increase of pressure beneath the piston 31, the combined areas of piston 31, piston 38, leakage pistons 34 and 43, and valve 27, will exceed the pressure area of piston 47, the valve 27 will open, brake pipe 19 will exhaust to atmosphere, and the brakes will be set in emergency position in the usual manner.

Immediately the cut-out cocks at the inactive stations are closed, brake pipe pressure will be restored in chamber 32 beneath piston 31, the valve 27, under the preponderance of main reservoir pressure on the piston 47, will be closed, and the system again be brought to normal working condition.

In the foregoing description I have referred particularly and have shown in the drawings heretofore discussed the application of my invention to an electric locomotive or to a multiple unit system of electric locomotives, the system, as disclosed in Fig. 1, being capable of use interchangeably with either make-up of equipment.

Obviously, the system disclosed in Fig. 1, where the external control pipe, heretofore described, is used, could be applied to steam locomotives where two or more are coupled for dead heading, but as the system, when applied directly to two or more locomotives, would preferably be somewhat simplified, although not departing in principle from the system heretofore disclosed, I have shown in Fig. 7 an application of the system specifically designed for steam locomotives.

Referring to Fig. 7, 56 indicates the active station preferably, and as is usual, on the lead engine, 57 represents the inactive station on the deadhead. The stations 56 and 57 are connected, respectively, by pipes 58 and 59 with main reservoir 60 and 61, as shown. The connections 58 and 59 have each a cut-out cock 62 and 63, the cock 62 of the active station being open, while on the deadhead the cock 63 will be closed.

The condition of stations, thus far described, that is, active and inactive, and their relation, are the same as in the system heretofore set forth, and, as will appear, the automatic control valve is of the same construction and coupled into the system in a manner very similar to that hereinbefore set forth.

The automatic control valve 64 is the same in its design, make-up, and function as the valve shown in Fig. 1 and already described. It has piston 55 in the top of the casing which receives pressure from main reservoir by the connection 66 and tends always to keep the valve 67 closed.

Valve 67 is subject to pressure, coming from brake pipe 68 by connection 69, tending to open said valve and operating against main reservoir pressure on top of piston 55.

Extending upwardly from valve 67 is a stem 70, as heretofore described, on which is mounted piston 71, subject on its lower side to pressure coming by connection 72 from external control pipe 73 which tends to raise piston 71 and open valve 67. Between valve 67 and piston 71 is leakage piston 74 to take care of pressure leaking past piston 71, the relief ports in the casing 64, as before stated, permitting pressure coming past piston 71 to leak to atmosphere and prevent building up beneath said piston. Depending from piston 55 is a stem 75, in line with but preferably independent of stem 70, and on said stem is a piston 76, subject on its underside to pressure from external control pipe 73 through connection 77. Connection 77 is coupled by cross-pipe 78 with main reservoir connection 58 leading to engineer's brake valve, so that main reservoir pressure stands beneath piston 76. A cut-out cock 79 is provided in connection 77, this cock 79 of the active station 56 being closed, while at the inactive station 57 it is open.

On the stem 75 below piston 76 is a leakage piston 89 to take care of leakage past piston 76, relief ports to atmosphere being provided in casing 64 below piston 80, all as heretofore described in connection with Fig. 1.

The device of Fig. 7 functions in a manner similar to that set forth in describing the operation of Fig. 1.

Normally, with the parts in position as shown in Fig. 7, valve 67 is closed by preponderance of main reservoir pressure standing above piston 55 and overbalancing brake pipe pressure against valve 67; external control pipe pressure beneath piston 71, and main reservoir pressure beneath piston 76; the piston areas and pressures being so proportioned as to give this result.

If, however, cut-out cock 63 on the deadhead is opened, main reservoir pressure will at once pass by brake valve pipe 59; cross connection 78, and connection 77, to external control pipe 73, and then, by connection 72, to automatic control valve 64, beneath piston 71.

This increase of pressure beneath piston 71 will overcome pressure above piston 55; valve 67 will open, brake pipe 68 will be exhausted, and an emergency application of brakes effected. It will be apparent that, upon opening of cock 63 at the inactive station, main reservoir pressure will flow both to the control valve of the active station 56 and to the control valve of the inactive station to effect application of brakes, the connection 77 delivering pressure coming from cross connection 78 in both directions, that is, directly to the control valve of the inactive station, and, by external control pipe 73, to the active station.

The action described would occur with two or any number of stations coupled as set forth, so that one was active and the others deadheads.

With the automatic valve described, coupled into air brake systems in any of the several ways set forth, it will be apparent that any condition of equipment where (1) control stations or brake valves are mounted on a single electric, or other locomotive; (2) where multiple electric or other locomotive units having brake control stations or brake valves are coupled together for a double heading, or (3) where a plurality of steam locomotives are coupled, which interferes with or endangers the control of the braking system from any active control station or brake valve, will at once result in applying the brakes and stopping operation, so that loss of control on the lead engine, or at the active control station or brake valve, wherever it may be, and the disastrous consequences following such an abnormal condition are done away with.

It will be observed that the automatic valve of my invention can be installed adjacent any control station or brake valve, or upon any one of the multiple units, where it is used with such units, and very effectively control the system and guard against the difficulties now incident to double heading.

It will be understood that my use of the phrase "double-heading" in my specification and claims contemplates and includes any assemblage of two or more control stations, any one of which may be the active control station for manipulation of brakes.

I claim:

1. A double heading device for air brake systems employing a source of main reservoir pressure, a brake pipe, and a plurality of brake valves, one of which is in active control of braking; comprising a brake pipe exhaust valve normally closed under pressure; and means automatically to operate said valve, exhaust the brake pipe, and apply brakes, when an inactive brake valve is cut in.

2. A double heading device for air brake systems employing a source of main reservoir pressure, a brake pipe, and a plurality of brake valves, one of which is in active control of braking; comprising a brake pipe exhaust valve normally closed under main reservoir pressure; and means automatically to operate said valve, exhaust the brake pipe, and apply brakes when an inactive brake valve is cut in.

3. A double heading device for air brake systems employing a source of main reservoir pressure, a brake pipe, and a plurality of brake valves, one of which brake valves is in active control of braking; comprising a brake pipe exhaust valve normally closed by main reservoir pressure; means normally subject to pressure tending to open said valve; and means to augment pressure on said valve opening means when an inactive brake valve is cut in automatically to open said valve, exhaust the brake pipe, and apply the brakes.

4. A double heading device for air brake systems employing a source of main reservoir pressure, a brake pipe, and a plurality of brake valves, one of which is in active control of braking; comprising a brake pipe exhaust valve normally closed by main reservoir pressure; means normally subject to brake pipe pressure tending to open said valve; and means to augment pressure on said valve opening means when an inactive brake valve is cut in automatically to open said valve, exhaust the brake pipe, and apply the brakes.

5. A double heading device for air brake systems employing a source of main reservoir pressure, a brake pipe, and a plurality of brake valves, one of which is in active control of braking; comprising a brake pipe exhaust valve; a pressure connection normally to close said valve; an overbalanced pressure connection opposed to said first mentioned pressure connection and tending normally to open said valve; and a normally closed pressure connection operative when an inactive brake valve is cut in to augment said overbalanced pressure, open said valve, and apply the brakes.

6. A double heading device for air brake systems employing a source of main reservoir pressure, a brake pipe, a plurality of brake valves, one of which is in active control of braking; comprising a brake pipe exhaust valve; a main reservoir pressure connection normally to close said valve; an overbalanced brake pipe pressure connection opposed to said main reservoir pressure and tending normally to open said valve; and a normally closed pressure connection operative when an inactive brake valve is cut in to augment said brake pipe pressure, open said valve, and apply the brakes.

7. A double heading device for air brake systems, employing a source of main reservoir pressure, a brake pipe, and a plurality of brake valves, one of which is in active control of braking; comprising a brake pipe exhaust valve; a pressure connection normally to close said valve; an overbalanced pressure connection opposed to said first mentioned pressure connection and tending normally to open said valve; and a normally closed main reservoir connection operative when an inactive brake valve is cut in, to augment said overbalanced pressure, open said valve, and apply the brakes.

8. A double heading device for air brake systems employing a source of main reservoir pressure, a brake pipe, and a plurality of brake valves, one of which is in active control of braking; comprising a brake pipe exhaust valve; a main reservoir pressure connection normally to close said valve; an overbalanced brake pipe pressure connection opposed to said main reservoir pressure connection and tending normally to open said valve; and a normally closed main reservoir connection operative when an inactive brake valve is cut in, to augment said brake pipe pressure, open said valve, and apply the brakes.

9. A double heading device for air brake systems employing a source of main reservoir pressure, a brake pipe, and a plurality of brake valves, one of which is in active control of braking; comprising a brake pipe exhaust valve normally closed under pressure; an overbalanced piston subject to pressure tending to open said brake valve; and a control pipe to augment pressure on said overbalanced piston when an inactive brake valve is cut in, and automatically operate said brake pipe exhaust valve, exhaust the brake pipe, and apply the brakes.

10. A double heading device for air brake systems employing a source of main reservoir pressure, a brake pipe, and a plurality of brake valves, one of which is in active control of braking; comprising a brake pipe exhaust valve normally closed under main reservoir pressure; an overbalanced piston subject to brake pipe pressure tending to open said brake valve; and a control pipe to throw main reservoir pressure on said overbalanced piston when an inactive brake valve is cut in, and automatically operate said brake pipe exhaust valve, exhaust the brake pipe, and apply the brakes.

11. A double heading device for air brake systems employing a source of main reservoir pressure, a brake pipe, and a plurality of brake valves, one of which is in active control of braking; comprising a brake pipe exhaust valve normally closed under main reservoir pressure; an overbalanced piston normally subject to brake pipe pressure tending to open said brake valve; and a control pipe to throw main reservoir pressure on said overbalanced piston when an inactive brake valve is cut in, and automatically operates said brake pipe exhaust valve, exhaust the brake pipe, and apply the brakes.

12. A double heading device for air brake systems employing a source of main reservoir pressure, a brake pipe, and a plurality of brake valves, one of which is in control of braking; comprising a brake pipe exhaust valve normally closed under main reservoir pressure; a piston controlling said brake valve; a train pipe connection delivering brake pipe pressure beneath said piston; and a main reservoir connection leading to said train pipe connection to deliver main reservoir pressure thereto when an inactive brake valve is cut in, automatically to operate said brake pipe exhaust valve, exhaust the brake pipe, and apply the brakes.

13. A double heading device for air brake systems employing a source of main reservoir pressure, a brake pipe, and a plurality of brake valves, one of which is in active control of brakes; comprising a brake pipe exhaust valve normally closed under pressure; an overbalanced piston subject to brake pipe pressure tending to open said brake valve; a control pipe to deliver brake pipe pressure to said overbalanced piston; a second overbalanced piston subject to main reservoir pressure tending to open said brake valve; a second control pipe to deliver main reservoir pressure; and a connection between said second control pipe and said first control pipe to throw main reservoir pressure on said first mentioned overbalanced piston when an inactive brake valve is cut in, and automatically operate said brake pipe exhaust valve, exhaust the brake pipe, and apply the brakes.

14. A double heading device for air brake systems employing a source of main reservoir pressure, a brake pipe, and a plurality of brake valves, one of which is in active control of braking; comprising a brake pipe exhaust piston valve normally closed under pressure; a control pipe delivering brake pipe pressure to said piston tending to open said valve subject to main reservoir pressure; a second control pipe carrying main reservoir pressure; and a connection between said second control pipe and said first control pipe to deliver main reservoir pressure beneath said first named piston when an inactive brake valve is cut in, and automatically operate said brake pipe exhaust valve, exhaust the brake pipe, and apply the brakes.

15. In a double heading system for air brakes, the combination of a plurality of brake valves, one of which is in active control of braking; a piston valve independent of said brake valves automatically to control brake pipe exhaust; a main reservoir pressure connection normally closing said independent exhaust valve; a control pipe extending from an inactive station and normally delivering brake pipe pressure to said piston valve tending to open said valve; and a normally closed main reservoir connection with said control pipe operative to deliver main reservoir pressure beneath said piston when an inactive brake valve is cut in, and automatically operate said brake pipe piston exhaust valve, exhaust the brake pipe, and apply the brakes.

16. In a double heading system for air brakes, the combination of a plurality of brake valves, one of which is in active control of braking; a piston valve independent of said brake valves automatically to control brake pipe exhaust; a main reservoir pressure connection normally closing said independent exhaust valve; and a control pipe extending from an inactive station and normally delivering brake pipe pressure to said piston valve tending to open said valve; said control pipe being subject to main reservoir pressure from the inactive brake valve if said inactive brake valve is cut in, automatically to operate said brake pipe piston exhaust valve, exhaust the brake pipe, and apply the brakes.

17. In a double heading system for air brakes, the combination of a plurality of brake valves, one of which is in active control of braking; a piston valve independent of said brake valves automatically to control brake pipe exhaust; a main reservoir pressure connection normally closing said independent exhaust valve; a control pipe extending from an inactive station and normally delivering brake pipe pressure to said piston valve tending to open said valve; and a second control pipe carrying main reservoir pressure connected to said first control pipe and operative, upon cutting in of an inactive brake valve, to deliver main reservoir pressure to said first control pipe, and automatically operate said brake pipe piston exhaust valve, exhaust the brake pipe, and apply the brakes.

18. In a double heading system for air brakes, the combination of a plurality of brake valves, one of which is in active control of braking; a piston valve independent of said brake valves automatically to control brake pipe exhaust; a main reservoir pressure connection normally closing said independent exhaust valve; a second main reservoir pressure connection delivering to an overbalanced piston tending to open said valve; a control pipe delivering brake pipe pressure to an overbalanced piston tending to open said valve; and a normally closed main reservoir connection with said control pipe, operative to deliver main reservoir pressure beneath said piston when an inactive brake valve is cut in, and automatically operate said brake pipe piston exhaust valve, exhaust the brake pipe, and apply the brakes.

19. An automatic valve for air brake systems, comprising a casing adapted to be coupled to the brake pipe for exhaust, a valve in said casing controlling brake pipe exhaust; a piston in said casing subject to pressure tending to close said valve, and a normally overbalanced piston in said casing subject to pressure tending to open said valve, said last named piston being operative under augmented pressure to open said exhaust valve.

20. An automatic valve for air brake systems, comprising a casing adapted to be coupled to the brake pipe for exhaust, a valve in said casing controlling brake pipe exhaust, a piston in said casing subject to main reservoir pressure tending to close said valve, and a normally overbalanced piston in said casing subject to brake pipe pressure tending to open said valve, said normally overbalanced piston being operative under augmented pressure to open said exhaust valve.

21. An automatic brake valve for air brake systems, comprising a casing adapted to be connected to a brake pipe for exhaust, a valve in said casing controlling brake pipe exhaust, a piston in said casing subject to pressure normally closing said valve, a second normally overbalanced piston in said casing subject to pressure tending to open said valve, a third normally overbalanced piston in said casing subject to pressure tending to open said valve, said normally overbalanced pistons being operative under augmented pressure to open said valve and exhaust the brake pipe.

22. An automatic brake valve for air brake systems, comprising a casing adapted to be connected to a brake pipe for exhaust, a valve in said casing controlling brake pipe exhaust, a piston in said casing subject to main reservoir pressure normally closing said valve, a second normally overbalanced piston in said casing subject to main reservoir pressure tending to open said valve, a third normally overbalanced piston in said casing subject to brake pipe pressure tending to open said valve, said normally overbalanced pistons being operative under augmented pressure to open said valve and exhaust the brake pipe.

23. An automatic brake valve for air brake systems comprising a casing adapted to be connected to a brake pipe for exhaust, an exhaust valve in said casing, a piston subject to main reservoir pressure normally closing said valve, and a double overbalanced piston in said casing subject to main reservoir pressure tending normally to open said exhaust valve, said normally overbalanced piston being operative under augmented pressure to release said valve, exhaust the brake pipe, and apply the brakes.

24. An automatic brake valve for air brake systems comprising a casing adapted to be connected to a brake pipe for exhaust, an exhaust valve in said casing, a piston subject to main reservoir pressure normally closing said valve, a double overbalanced piston in said casing subject to main reservoir pressure tending normally to open said exhaust valve, and a second normally overbalanced double piston subject to brake pipe pressure tending normally to open said valve, said pistons being operative under augmented pressure to release said valve, exhaust the brake pipe and apply the brakes.

25. An automatic brake valve for air brake systems comprising a casing adapted to be connected to a brake pipe for exhaust, an exhaust valve in said casing, a piston subject to main reservoir pressure normally closing said valve, a double overbalanced piston in said casing subject to main reservoir pressure tending normally to open said exhaust valve, and a second normally overbalanced double piston subject to brake pipe pressure tending normally to open said valve, said pistons being operative under augmented pressure and upon said second piston to release said valve, exhaust the brake pipe, and apply the brakes.

26. An automatic brake valve for air brake systems comprising a casing adapted to be connected to a brake pipe for exhaust, an exhaust valve in said casing, a valve actuating, pressure controlled piston in said casing, and a leakage piston on the pressure side of said valve-actuating piston and reriprocable therewith.

27. The combination of a casing having a normally open leakage port and valve controlled port; a valve in said casing controlling said last named port; a pressure-controlled piston in said casing to actuate said valve; and a leakage piston on the pressure side of and reciprocable with said valve actuating piston, leakage past which is delivered to the normally open leakage port in said casing.

28. The combination of a casing having a normally open leakage port and a valve controlled port; a valve in said casing controlling said last named port; a stem connected with said valve; a valve-actuating, pressure-controlled piston on said stem; and a leakage piston carried by said stem on the pressure side of said valve actuating piston, leakage past which is delivered to the normally open leakage port in said casing.

29. The combination of a casing; a valve in said casing; a stem connected with said valve; a valve-actuating, pressure-controlled piston on said stem; and a leakage piston on said stem between said valve and said actuating piston.

In testimony whereof I have hereunto set my hand.

DANIEL J. SULLIVAN.